United States Patent [19]

Tesh et al.

[11] Patent Number: 4,893,946
[45] Date of Patent: Jan. 16, 1990

[54] ROLLER FOR SPINNING FRAME

[75] Inventors: David W. Tesh; David D. Wesner, both of Greensboro, N.C.

[73] Assignee: Amkor Industries, Inc., Greensboro, N.C.

[21] Appl. No.: 352,001

[22] Filed: May 15, 1989

[51] Int. Cl.$^4$ .............................................. F16C 19/20
[52] U.S. Cl. ...................................... 384/549; 57/103; 384/565
[58] Field of Search ............... 384/549, 548, 445, 565; 57/103, 337, 340

[56] References Cited

U.S. PATENT DOCUMENTS

| | | | |
|---|---|---|---|
| 3,958,844 | 5/1976 | Huppi et al. | 384/549 |
| 4,607,484 | 8/1986 | Schuster | 57/337 |
| 4,624,103 | 11/1986 | Oberstrass | 57/337 |
| 4,676,673 | 6/1987 | Stahlecker et al. | 384/549 |
| 4,718,226 | 1/1988 | Schuster et al. | 57/340 |

Primary Examiner—Lenard A. Footland
Attorney, Agent, or Firm—Steven J. Hultquist

[57] ABSTRACT

A spinning frame roller comprising a core body on an outer peripheral surface of which is provided a circumferentially continuous, radially reentrant dovetail channel, with a correspondingly configured peripheral annular ring having a radially inwardly extending dovetail protrusion on its inner face matably engaging the dovetail channel and outer peripheral surface. The peripheral annular ring has an aspect ratio (radial thickness-/axial thickness) of from about 0.25 to about 0.65, and is formed of a material having a durometer value of from about 55 to about 90. The roller in use is mounted on a shaft in a spinning frame for textile processing applications, and achieves extended wear and reduced tendency to "throwing" of the peripheral annular ring, relative to prior art rollers characterized by low durometer, high aspect ratio peripheral annular rings.

21 Claims, 2 Drawing Sheets

ROLLER FOR SPINNING FRAME

BACKGROUND OF THE INVENTION

1. Field of the Invention

This invention generally relates to rollers on discs of the type employed in spinning frame apparatus.

2. Description of the Related Art

In the textile and fabric industries, spinning frames are widely employed, which use a multiplicity of rollers or disc which are mounted for rotation on shafts, and rotate at high speeds on the order of 10,000–20,000 rpm in yarn processing operations.

Such rollers typically comprise a disc-shaped core body on the periphery of which is deployed a "tire" of synthetic elastomeric material, to provide a bearing surface for contacting the roller with a yarn twist tube.

Due to the extremely high rotational speeds experienced by these rollers in spinning frame operation, it is critically important that the tire be adequately secured to the disc core body, in order that the tire is not "thrown" in operation as a result of centrifugal force exerted thereon.

The problem of maintaining the tire fixedly secured to the core body of the roller high-speed during operation is further exaccerbated by the fact that the physical properties, e.g., specific heat capacities, conductivities, and coefficients of thermal expansion, of the respective core body and tire elements are quite different from one another. As a result, there is present at the interface or juncture of the core body and the tire a substantial differential in thermal properties, which tend to favor separation and throwing of the tire, when the roller has been subjected to high rotational speeds for sustained periods of operation, as a result of frictional heat buildup in the roller and its constituent core body and tire parts.

Inasmuch as it has not been possible to closely match the thermal physical properties of the core body and tire of the roller, since the core body typically is made of aluminum or other metal, and the tire typically is formed of a synthetic elastomeric material, much effort has been focused on improving the means and methods of securing the tire to the core body to minimize the likelihood of tire separation and "throwing" during high-speed operation.

One roller construction which has been employed by the art is shown in FIG. 1 ("PRIOR ART"), which is a partial elevation view, in cross-section, of the edge region of a spinning frame roller 10 in which the core body 12 is formed on its outer peripheral surface 14 with a generally V-shaped groove 16, as shown. In this construction, the tire 18 is formed with a V-shaped protrusion 20 of corresponding shape for mating with the V-shaped groove 16. Between the core body 12 and tire 18 is provided a thin film of an adhesive composition 22.

This roller construction, by virture of the V-shaped groove and V-shaped protrusion of the respective core body and tire elements, provides an increased surface area for bonding, relative to a completely linear interface, and enables the tire to better resist lateral forces which may otherwise tend to displace the tire from the core body in operation.

Nonetheless, the presence of the adhesive introduces a further bonding operation to the manufacture of the roller, and it is frequently difficult to obtain a substantially even thickness of the adhesive medium along the full extent of the bonding surfaces, particularly in the V-shaped groove, where surface tension effects may render it difficult for the adhesive to penetrate into the lower extremity of the groove.

Apart from such difficulties, a major disadvantage of this adhesively bonded construction is the fact that the substantial heat generated in the roller as a result of friction causes degradation and fracturing of many adhesive compositions, thereby promoting the tendency of the tire to be thrown from the core body. Accordingly, it has been common practice to utilize high tensile shear strength adhesives based on cyanoacrylates, due to their rapid fixturing properties and other favorable performance characteristics. Nonetheless, under the high temperature conditions resulting from frictional heat buildup in the roller, the cyanoacrylate adhesives tend to liberate cyanic volatile species, e.g., methyl isocyanate, hydrogen cyanide, and the like, which are of an extremely hazardous and toxic character.

Another roller design which has been employed in the art is shown in FIG. 2 ("PRIOR ART"), as a cross-section, in elevation, of an outer portion of the roller. In this design, the roller 25 comprises a core body 26 having its outer periphery shaped with reentrant cavities 28 and 30 bounded by the respective shoulders 32 and 34 and bulbous extremity 36 of the core body. The tire 38 in this construction may be molded directly onto the outer periphery of the core body. The problem associated with this design is that the radial width (W) of the tire tends to be excessive, with regard to the centrifugal force thereon and the tendency of the tire to be thrown during operation of the roller at high speeds, e.g., in the range of 10,000 to 20,000 rpm.

U.S. Pat. No. 4,964,324 to H. Gassner et al discloses a friction roller which includes an aluminum or aluminum alloy core body which is joined a polyurethane friction ring. A dovetail groove is provided in this friction roller, on a laterally extending top surface (see FIG. 2 of the patent) of the core body. FIGS. 6 and 7 of this patent show a "sideways T" core body projection. The friction ring is made of a resilient plastics material, such as polyurethane of suitable hardness, which is molded onto the ring, preferably under pressure (column 4, lines 27–34).

U.S. Pat. No. 332,998 to C. Coupland discloses a drawing and spinning machine roll which has a dovetail joint on an outer peripheral surface. In this design, the contact elements are in the form of segments which are circumferentially packed around the outer perimeter of the wheel. The contact elements in this roll have a lesser thickness (as measured in the axial direction) than the ribs forming the dovetail joint. The body of the roll is in the form of half-sections, which are joined to one another by bolt and nut assemblies, as shown in FIG. 1 of the patent.

U.S. Pat. No. 3,610,061 to W. H. Holzboog describes an idle or drive wheel which is formed as an assembly from sections which include a driving disc, a clamping disc, and an elastomeric ring. These three elements are sandwiched together, as shown in FIGS. 1–3 of the patent.

U.S. Pat. No. 402,631 to C. M. Thompson discloses a sand reel in which the wear surface is formed of a multiplicity of segments, as shown in FIG. 3 of the patent. Each of the segments is formed with V-shaped recesses to accommodate mating engagement with discs mounted in axial-spaced relationship relative to one another on a central shaft.

U.S. Pat. No. 668,385 to F. W. Morgan discloses a vehicle tire assembly arrangement, in which an outer rubber tire is formed with a dovetail-shaped channel accommodating insertion of a fabric base portion of hour glass shape, which is retained between spaced-apart "tire-clamping members" of the tire, assembly as shown in FIG. 2 of the patent. In another embodiment (FIG. 4 of the patent), the fabric insert includes radiating leaves extending up into the rubber of the tire and firmly embedded therein to retain the tire in position.

U.S. Pat. No. 668,384 to F. W. Morgan discloses a vehicle wheel having wires embedded in portions of the compressed fabric base of a vehicle tire.

U.S. Pat. No. 2,665,521 discloses a toy wheel assembly, in which an outer wheel portion is injection molded from semi-resilient, elastomeric material, following which the body of the wheel is injection molded in the central opening of the tire, utilizing the tire as a part of the mold or die. The cross-section of the wheel assembly (see FIG. 4 of the patent) reveals the wheel body to have side flanges which receive the inner edges of the tire.

It would be a significant advance in the art to provide a roller adaptable for use in a spinning frame, which has improved resistance to throwing of the tire portion thereof during high-speed operation, relative to spinning frame rollers of the prior art.

Accordingly, it is an object of the present invention to provide a spinning frame roller of such type, characterized by a tire with an enhanced retention ability and resistance to being thrown from the core body during rotation of the roller at high speeds.

It is another object of the present invention to provide a spinning frame roller which is of comparatively simple construction, and which can be manufactured in a ready, and relatively inexpensive manner.

It is still another object of the invention to provide a spinning frame wheel which effectively dissipates heat generated during high speed rotation of the roller.

Other objects and advantages of the invention will be more fully apparent from the ensuing disclosure and appended claims.

SUMMARY OF THE INVENTION

The present invention relates to a roller having particular utility in a spinning frame.

The roller of the present invention comprises a generally disc-shaped core body having a central axis and an outer peripheral surface. The outer peripheral surface of the core body includes a circumferentially continuous, radially reentrant dovetail channel therein, preferably at a central portion of the outer peripheral surface.

The above-described core body of the roller has associated therewith a peripheral annular ring which is axially coextensive in thickness with a radially outer portion of the core body adjacent thereto. The ring is of generally annular shape with a radially inwardly extending dovetail protrusion on an inner surface thereof. The dovetail protrusion and inner surface of the ring matably engage the dovetail channel outer peripheral surface of the core body.

In a preferred aspect of the invention, the peripheral annular ring in a roller of the general type described above, has a radial thickness dimension, measured between the inner surface of the annular ring and an outer surface thereof, which is from about 0.25 to about 0.65 times the axial thickness dimension of the ring.

In another preferred aspect, the annular ring of a roller of the type described hereinabove may be formed of a resilient elastic material having durometer value of from about 55 to about 90.

Other aspects and features of the invention will be more fully apparent from the ensuing disclosure and appended claims.

DETAILED DESCRIPTION OF THE INVENTION, AND PREFERRED EMBODIMENTS THEREOF

Figure 1:
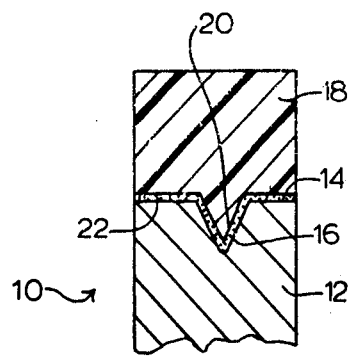
FIG. 1 ("PRIOR ART") is a sectional elevation view of an outer portion of a spinning frame roller known in the art.
Figure 2:
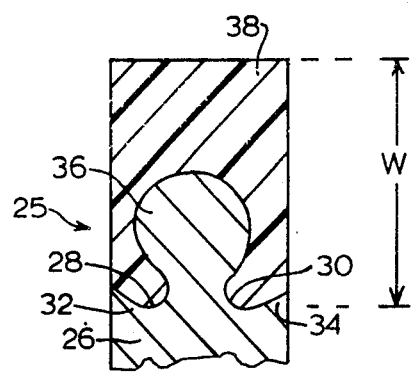
FIG. 2 ("PRIOR ART") is a sectional elevation view of an outer portion of a spinning frame roller according to another design known in the art.

Referring now to the drawings, FIGS. 1 and 2 show respective prior art roller constructions, as described hereinabove in the "Background of the Invention" section hereof.

Figure 3:
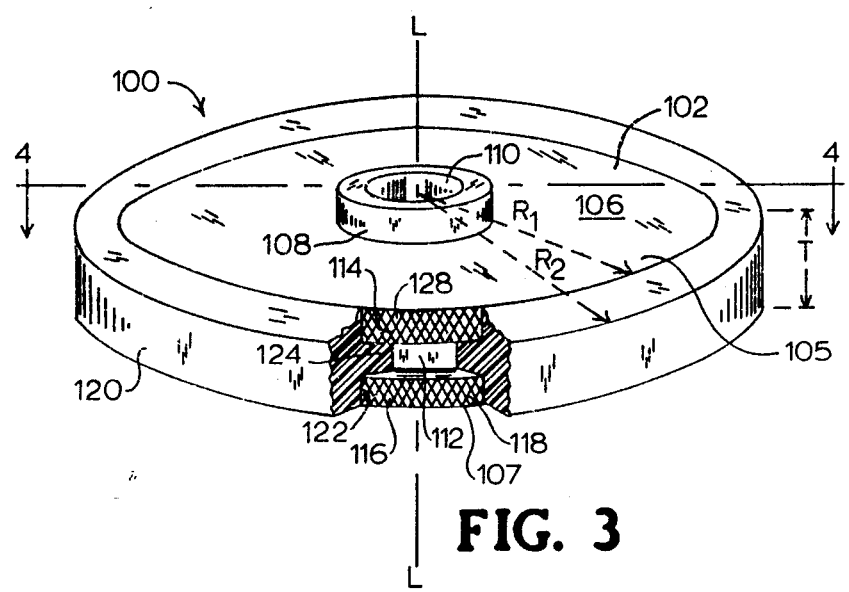
FIG. 3 is a perspective view of a spinning frame roller according to one embodiment of the present invention.

FIG. 3 is a perspective view of a spinning frame roller 100 according to one embodiment of the invention, partially broken away to show the details of the peripheral portion thereof. The roller as shown comprises a core body 102 of unitary single-piece construction, having a central axis L—L, which is coincident with the axis of rotation of the roller when same is mounted on a suitable shaft in the spinning frame assembly.

The core body 102 of the roller features a generally planar and circular-shaped main top face 106, and a corresponding generally planar and circular-shaped main bottom face 107. On the top face 106 is provided an integrally formed collar 108 to facilitate proper installation of the roller on a rotatable shaft, the core body being provided with a central circular opening 110 extending through the core body along the central axis L—L.

The perimeter of the circular-shaped top face 106 of the core body has a radius, measured from central axis L—L, which is identified in the FIG. 1 drawing as $R_1$.

The spinning frame roller 100 further comprises a peripheral annular ring 104 which is coextensive in axial thickness with the core body outer portion 105 adjacent thereto, both being of axial thickness T as shown in the drawing.

The peripheral annular ring 104 has an outer peripheral surface 120 which is characterized by a radius, measured from central axis L—L, of $R_2$, as shown in FIG. 3.

At the inner surface 122 of the peripheral annular ring, there is provided a dovetail-shaped protrusion 124 which is reposed in the dovetail channel 112 in the outer peripheral surface 128 of the core body 102.

The dovetail channel 112 extends circumferentially around the entire peripheral extent of the core body, at a central portion of the outer surface, preferably being positioned centrally of the axial thickness T of the core body. In this configuration, the dovetail-shaped channel 112 is bounded by outer peripheral surface portions 114 and 116 of the core body outer peripheral surface, each of such outer peripheral surface portions extending axially from the juncture with the dovetail channel to an adjacent face (top face 106, and bottom face 107, respectively) of the core body.

Each of the core body outer peripheral surface portions 114 and 116 may suitably be textured such as by knurling 118 thereon, or by any other surface roughening or contoured configuration serving to enhance the retention of the peripheral annular ring on the core body of the roller.

Figure 4:
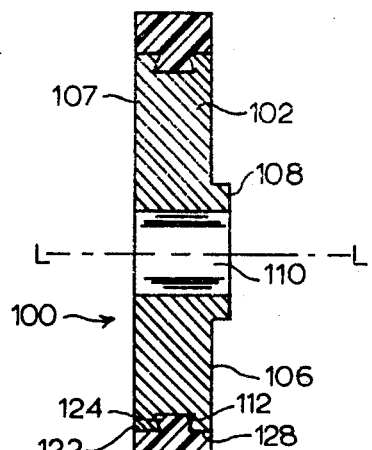
FIG. 4 is a sectional elevation view of the roller of FIG. 3, taken along line 4—4 thereof.

FIG. 4 shows a sectional view of the FIG. 3 roller, taken along line 4—4 thereof. All parts and features in FIG. 4 are numbered correspondingly therein with respect to the same parts and features shown in FIG. 3. The roller 100 comprises core body 102 having a central passage 110 of circular cross-section extending therethrough, coaxial with the central axis L—L, and circumscribed at first face 106 by collar 108. The circular-shaped first face 106 is parallel and in spaced relation to second face 107, both being generally planar and having a substantially radially coextensive character relative to one another.

The outer peripheral surface 128 of the core body 102 is axially coextensive with the peripheral annular ring 104. The peripheral outer surface of the core body features dovetail channel 112 therein, in which is matably reposed the dovetail protrusion 124 extending radially inwardly from inner face 122 of the peripheral annular ring. In this manner, the inner surface 122 of peripheral annular ring 108 mates with the outer peripheral surface 128 of the core body.

Figure 5:
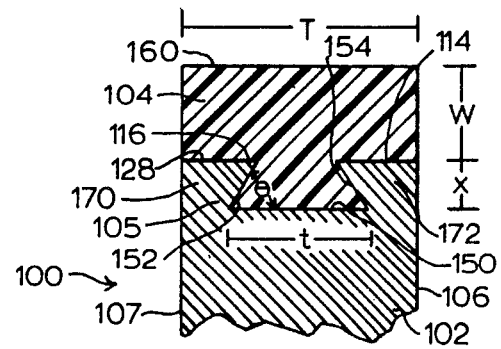
FIG. 5 is a sectional elevation view of the outer peripheral part of the roller shown in FIGS. 3 and 4.

FIG. 5 shows an enlarged cross-sectional view of an outer portion of the roller of FIG. 5, showing the specific dimensional characteristics of the peripheral annular ring.

As illustrated, the dovetail channel in the core body 102 has a floor 150 with an axial dimension t. The floor and side walls 152 and 154 of the channel are dimensionally sized so that the included angle between the respective side walls and floor, denoted as angle 0, may range from about 50° to about 80°, more preferably from about 55° to about 75°, and most preferably from about 60° to about 70°.

The dovetail channel is bounded at its radially outer extent by outer peripheral surface portions 114 and 116 of outer peripheral surface 128.

As an illustrative embodiment of the invention, a roller of the type shown in FIGS. 3–5 may have an axial thickness T of 0.410 inch, a radius $R_1$ (see FIG. 3) of 1.25 inch, and a radius $R_2$ (see FIG. 3) of 1.44 inch.

In general, the depth of the dovetail channel, denoted as x in FIG. 5, may suitably range from about 0.005 inch to about 0.25 inch. At values less than about 0.005 inch, the depth of the dovetail channel tends to become too shallow to provide the desired retentive function for which the dovetail channel is intended. At depths above about 0.25 inch, there tends to be no significant additional increase in the retentive function of the channel, while at the same time, when the dovetail channel is forming by machining of a metal casting, the additional depth entails correspondingly greater machining and loss of removed material from the core body as scrap. As a balance of these competing considerations, the depth of the dovetail channel preferably is from about 0.05 to about 0.20 inch, and most preferably from about 0.07 to about 0.15 inch.

The selection of specific values for x and O will determine the axial thickness dimension t of the dovetail channel. This dimension should not become excessively large relative to the overall axial thickness T of the core body and peripheral annular ring, since otherwise the shoulders 170 and 172 at the periphery of the core body may become substantially weakened and susceptible to breakage in the machining or other forming operation employed to form the dovetail channel, and/or in use.

As indicated, the axial thickness dimension T in FIG. 5 is the axial thickness of the peripheral annular ring as well as the adjacent outer portion 105 of the core body. The axial thickness T of the peripheral annular ring 104 is selected so as to be coextensive in thickness dimension with the adjacent outer portion 105 of the core body 102. The width (radial thickness) W of the peripheral annular ring in turn is selected such that this dimension is from about 0.25 to about 0.65 times the axial thickness T of the ring.

This "aspect ratio," W/T, is a critically important parameter in the practice of the present invention. If the aspect ratio W/T is decreased to a value significantly below 0.25, the width W tends to become too small to provide the wear life desired for long-term service of the roller. On the other hand, if the aspect ratio W/T is increased to a value significantly above 0.65, centrifugal force effects on the ring during high-speed operation tend to become disproportionately larger and to promote "throwing" of the ring during such operation, as in prior art systems where aspect ratios on the order of 1 or higher have been employed. More preferably, based on the same considerations, the aspect ratio W/T in the roller of the present invention is from about 0.30 to about 0.55, and most preferably from about 0.35 to about 0.50.

In connection with this lower aspect ratio for the peripheral annular ring in the roller of the present invention, as compared with prior art roller systems, the peripheral annular ring in the roller of the present invention is formed of an elastic material having a durometer hardness value, as measured by ASTM D-2240, of from about 55 to about 90 durometer, while the tires of prior art rollers have significantly lower durometer values, as for example on the order of 50 or less.

Preferably the durometer hardness of the peripheral annular ring is from about 60 to about 80, and most preferably from about 65 to about 75. If the durometer value of the peripheral annular ring material in the roller of the present invention is decreased significantly below 55, the wear properties are correspondingly adversely affected and the service life of the overall roller is significantly reduced. On the other hand, if the durometer value of the peripheral annular ring material is increased to a value significantly above 90, the peripheral annular ring becomes substantially non-resilient and excessively brittle in character, which may result in shortened service life of the roller, as a result of the tendency of the peripheral annular ring to stress-crack after significant periods in service.

The combination of a low aspect ratio (W/T) in the range of from about 0.25 to about 0.65, and a durometer hardness range of from about 55 to about 90, provides a roller which is of compact configuration as regards the peripheral annular ring portion thereof, and which at the same time is characterized by a substantial service life, as compared to roller configurations of the prior art utilizing low durometer, high aspect ratio tires.

In this respect, the low aspect ratio characteristic of the present invention has a further advantage, in that the relatively low radial thickness of the peripheral annular ring compared to its axial thickness, results in frictional heat build-up in the ring being rapidly and efficiently transferred to the core body during use of the roller in a spinning frame operated continuously at high speed.

The core body of the roller according to the present invention is suitably constructed of a heat conductive material, preferably a metal, although other materials of construction, such as fiber-resin composites, ceramics, thermally conductive plastics, etc., may be satisfactorily employed.

In preferred practice, the core body in the roller of the present invention is formed of a aluminum or aluminum alloys. The core body may be formed by any suitable method of fabrication, e.g., extrusion, casting, machining, etc.

The peripheral annular ring preferably is constructed of a synthetic elastic material, but may suitably comprise any wear-resistant material of construction meeting the durometer criterion discussed hereinabove.

A particularly preferred peripheral annular ring material of construction is the polyester thermoplastic elastomer commercially available under the trademark HYTREL® from DuPont Company, Engineering Polymers Division, Wilmington, Delaware.

Other elastomers of a natural or synthetic character meeting the above durometer criterion may be suitably employed, including synthetic rubbers, and block copolymers containing hard (crystalline) and soft (amorphous) segments, including compositions based on comonomers such as butadiene, butylene terephthalante, ethylene, ethylene vinylacetate, sytrene, propylene, isoprene, etc. Illustrative elastomer compositions which may be suitable in the broad practice of the present invention include sytrene-butadiene-styrene block copolymers, styrene-isoprene-styrene block copolymers, styrene-ethylene/butylene-styrene type block copolymers, styrene-butadiene copolymers, styrene-isoprene copolymers, styrene-ethylene/propylene copolymers, polyester-based polyurethanes, polyether block amides, ethylene-octene copolymers polybutyleneterephthalate/polyether glycol copolymers, polyurethane elastomers, etc.

As indicated previously in connection with the description hereinabove of FIG. 3, it is within the purview of the present invention to provide a textured or mechanically roughened outer peripheral surface 128 (see FIG. 3), to enhance the securement of the peripheral annular ring to the core body of the roller. Such surface texturing may be effected by knurling, as shown in FIG. 3, or alternatively by any other suitable surface texturing method, such as sandblasting, abrading, shot-peening, etc.

It is also within the purview of the present invention to deploy an adhesive on the respective mating surfaces of the core body and the peripheral annular ring, including the outer peripheral surface portions 114 and 116, dovetail channel side walls 152 and 154, and dovetail channel floor 150, and/or inner surface 122 and dovetail protrusion 124 of the peripheral annular ring. As a result of the low aspect ratio peripheral annular ring employed in the roller of the present invention, frictional heat resulting from high speed rotation of the roller in service, is efficiently transferred from the peripheral annular ring to the core body of the roller. Thus, heat is conducted away from the peripheral annular ring/core body interface during high speed rotation of the roller. As a result, adhesives may be employed in the roller of the present invention, which may be wholly unsuitable in the high aspect ratio (tire) rollers of the prior art which are characterized by greater frictional heat build-up posing a risk of degradation of the adhesive medium and evolution of volatile decomposition reaction by-products.

Figure 6:
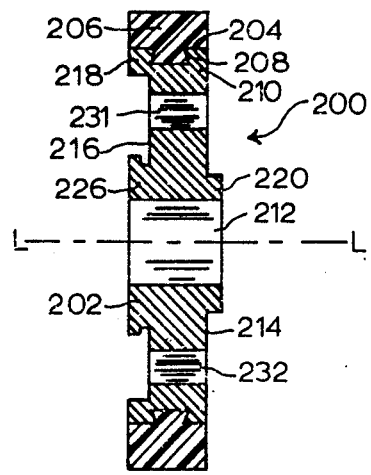
FIG. 6 is s sectional elevation view of a reflector roller according to another embodiment of the present invention.

FIG. 6 shows a roller 200 according to another embodiment of the present invention. This roller comprises a core body 202. At the outer peripheral surface 204 of this core body, a peripheral annular ring 206 is secured by means of a dovetail joint 208. The dovetail channel and the peripheral annular ring in the FIG. 6 roller may be dimensioned correspondingly to the roller embodiment illustratively described in connection with FIGS. 3-5 hereof. Thus, the peripheral annular ring has an axial thickness which is coextensive with the axial thickness of the radially outer portion 210 of the core body 202.

The core body has a central axis L—L, and is provided with a central open passage 212 extending axially therethrough, which is coaxial with the central axis L—L.

The core body 202 is characterized by circular-shaped, generally planar first and second faces 214 and 216, respectively. As shown, the first face is associated with a central collar portion 220 which is in raised relation to the first face 214 and extends circumferentially about the open passage 212 as shown.

Second face 216 of the core body 202 likewise has associated therewith a collar portion 226 which is in raised relation to the second face 216. The second face communicates at its radially outer portion 210 with a raised shoulder 218, providing the requisite axial thickness, so that the radially outer portion 210 of the core body is axially coextensive in thickness with the peripheral annular ring 206.

At an intermediate radial distance along its radial extent, the core body is provided with circumferentially spaced-apart circular openings 231 and 232 extending axially through the core body. The purpose of these openings is to facilitate determination of rotational speed and/or the cummulative number of rotations of the roller in operation, such as may be desired to accurately control the yarn processing operation being carried out by the spinning frame on which the roller of the type shown in FIG. 6 is deployed. Thus, the roller of FIG. 6 may be selectively positioned in register with suitable light source and detection means, so that light passes through the openings 231 and 232 during rotation of the roller 200, and otherwise reflected, is as sensed by appropriate photosensing means. In this manner, the number of sensed light pulses provide the measure of the number of rotations and/or rotational speed of the roller, which may then be employed as desired for control purposes.

For ease of manufacturing, it generally is preferred to form the peripheral annular ring of a suitable moldable ring material, directly on the core body of the roller, with the core body being deployed in a suitable mold and the peripheral annular ring being molded thereon. With such method, it may be necessary to selectively remove flashing or other excess material after the initial molding operation, in order to provide the ring with the desired shape, including an outer peripheral surface 120 (see FIG. 3) which preferably is parallel to the central axis L—L of the roller when viewed in radial cross-section, around the entire circumferential extent of the peripheral annular ring.

While the invention has been described with respect to specific aspects and features thereof, it will be appreciated that the utility of the invention is not thus limited, but rather extends to other variations, modifications, and embodiments which will be readily apparent to those skilled in the art, and accordingly, all such variations, modifications, and embodiments are to be regarded as being within the spirit and scope of the invention.

What is claimed is:

1. A spinning frame roller, comprising:
   (a) a unitary, disc-shaped core body having a central axis and an outer peripheral surface with a radially reentrant dovetail channel therein, the core body having a central circular opening extending axially therethrough for mounting of the roller on a shaft for rotation therewith;
   (b) a peripheral annular ring coextensive in axial thickness with a radially outer portion of the core body, the ring being characterized by:
      (i) an inner facing surface having a dovetail protrusion radially inwardly extending therefrom, so that the inner facing surface and dovetail protrusion respectively matably engage the outer peripheral surface and dovetail channel of the core body;
      (ii) a radial thickness W and an axial thickness T which are related to one another such that the aspect ratio W/T of the ring is from 0.25 to 0.65; and
      (ii) being formed of an elastic, material having durometer value of from 55 to 90.

2. A roller according to claim 1, wherein the dovetail channel in the core body is bounded by a floor and side walls, and the interior angle of the channel between the floor and a said side wall is from 50° to 80°.

3. A roller according to claim 2, wherein the included angle is from 55° to 75°.

4. A roller according to claim 2, wherein the included angle is from 60° to 70°.

5. A roller according to claim 1, wherein the dovetail channel in the core body has a radial depth of from 0.005 to 0.20 inch.

6. A roller according to claim 1, wherein the radial depth of the dovetail channel is from 0.01 to 0.15 inch.

7. A roller according to claim 1, wherein the radial depth of the dovetail is from 0.05 to 0.15 inch.

8. A roller according to claim 1, wherein the outer peripheral surface of the core body is mechanically textured.

9. A roller according to claim 1, wherein the outer peripheral surface of the core body is knurled.

10. A roller according to claim 1, devoid of any adhesive bonding medium between the core body and peripheral annular ring.

11. A roller according to claim 1, further comprising an adhesive bonding medium between the core body and peripheral annular ring.

12. A roller according to claim 1, wherein the peripheral annular ring is molded on the core body.

13. A roller according to claim 1, wherein the peripheral annular ring is formed of a synthetic elastic material.

14. A roller according to claim 1, wherein the peripheral annular ring is formed of synthetic rubber elastomer.

15. A roller according to claim 1, wherein the peripheral annular ring is formed of a polyester-based material.

16. A roller according to claim 1, wherein the aspect ratio W/T is from 0.30 to 0.60.

17. A roller according to claim 1, wherein the aspect ratio W/T is from 0.35 to 0.55.

18. A roller according to claim 1, wherein said peripheral annular ring is formed of a material having a durometer value of from 60 to 80.

19. A roller according to claim 1, wherein said peripheral annular ring is formed of a material having a durometer value of from 60 to 75.

20. A roller according to claim 1, wherein the first and second faces are generally planar and parallel to one another.

21. A roller, comprising:
   (a) a unitary disc-shaped core body having a central axis and circular-shaped main first and second faces in axially spaced relation to one another, the core body having an outer peripheral surface with a circumferentially continuous, radially reentrant dovetail channel therein, and a central opening in the core body for mounting thereof on a shaft for rotation; and
   (b) a peripheral annular ring axially coextensive in thickness with a radially outer portion of the core body, the ring (i) having an inner facing surface with a dovetail protrusion radially inwardly extending therefrom, with the inner facing surface and dovetail protrusion respectively matably engaging the outer peripheral surface and dovetail channel of the core body, (ii) having an aspect ratio of radial thickness to axial thickness of from 0.25 to 0.65, and (iii) being formed of a wear-resistant material having a durometer value of from 55 to 90.

* * * * *